United States Patent
Sugiyama

(10) Patent No.: US 7,735,589 B2
(45) Date of Patent: Jun. 15, 2010

(54) HOUSING STRUCTURE OF IN-WHEEL MOTOR

(75) Inventor: Mizuho Sugiyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 230 days.

(21) Appl. No.: 11/165,039

(22) Filed: Jun. 24, 2005

(65) Prior Publication Data

US 2006/0087182 A1 Apr. 27, 2006

(30) Foreign Application Priority Data

Aug. 25, 2004 (JP) ............................ 2004-245886

(51) Int. Cl.
*B60K 1/00* (2006.01)
(52) U.S. Cl. ..................... 180/65.51; 180/55
(58) Field of Classification Search ............... 180/65.1, 180/5.56, 65.5, 65.51, 55
See application file for complete search history.

(56) References Cited

U.S. PATENT DOCUMENTS

| 5,087,229 | A | * | 2/1992 | Hewko et al. ............... 475/149 |
| 5,180,180 | A | * | 1/1993 | Yamashita et al. ........... 180/253 |
| 5,472,059 | A | * | 12/1995 | Schlosser et al. ........... 180/65.5 |
| 5,841,209 | A | * | 11/1998 | Appeldorn ................... 310/89 |
| 6,922,004 | B2 | * | 7/2005 | Hashimoto et al. .......... 310/268 |
| 6,942,049 | B2 | | 9/2005 | Shimizu |
| 7,121,367 | B2 | * | 10/2006 | Ajiro et al. ................. 180/65.5 |
| 7,137,315 | B2 | * | 11/2006 | Chang et al. ............... 74/730.1 |
| 2003/0155161 | A1 | * | 8/2003 | Dorski et al. .............. 180/65.5 |
| 2003/0230443 | A1 | * | 12/2003 | Cramer et al. ............. 180/65.5 |
| 2004/0080223 | A1 | | 4/2004 | Shimizu |
| 2005/0236198 | A1 | * | 10/2005 | Jenkins ....................... 180/65.5 |

FOREIGN PATENT DOCUMENTS

| CN | 1424970 A | 6/2003 |
| EP | 1 362 736 A1 | 11/2003 |
| JP | A-05-338446 | 12/1993 |
| JP | A-08-048157 | 2/1996 |
| JP | A-2000-046157 | 2/2000 |
| JP | A-2001-315534 | 11/2001 |
| JP | A-2003-211979 | 7/2003 |

* cited by examiner

*Primary Examiner*—Glenn Dayoan
*Assistant Examiner*—Katy Meyer
(74) *Attorney, Agent, or Firm*—Oliff & Berridge, PLC.

(57) ABSTRACT

A housing structure of an in-wheel motor, the housing structure being formed by combining a plurality of divided housings, the housing structure receiving at least an electric motor for revolving a wheel, the housing structure includes a suspension side divided housing having a fixing boss for fixing the housing structure to a suspension system, and a connection side divided housing connecting to the suspension side divided housing and having a connection boss formed in a position corresponding to a position where the fixing boss is formed.

5 Claims, 5 Drawing Sheets

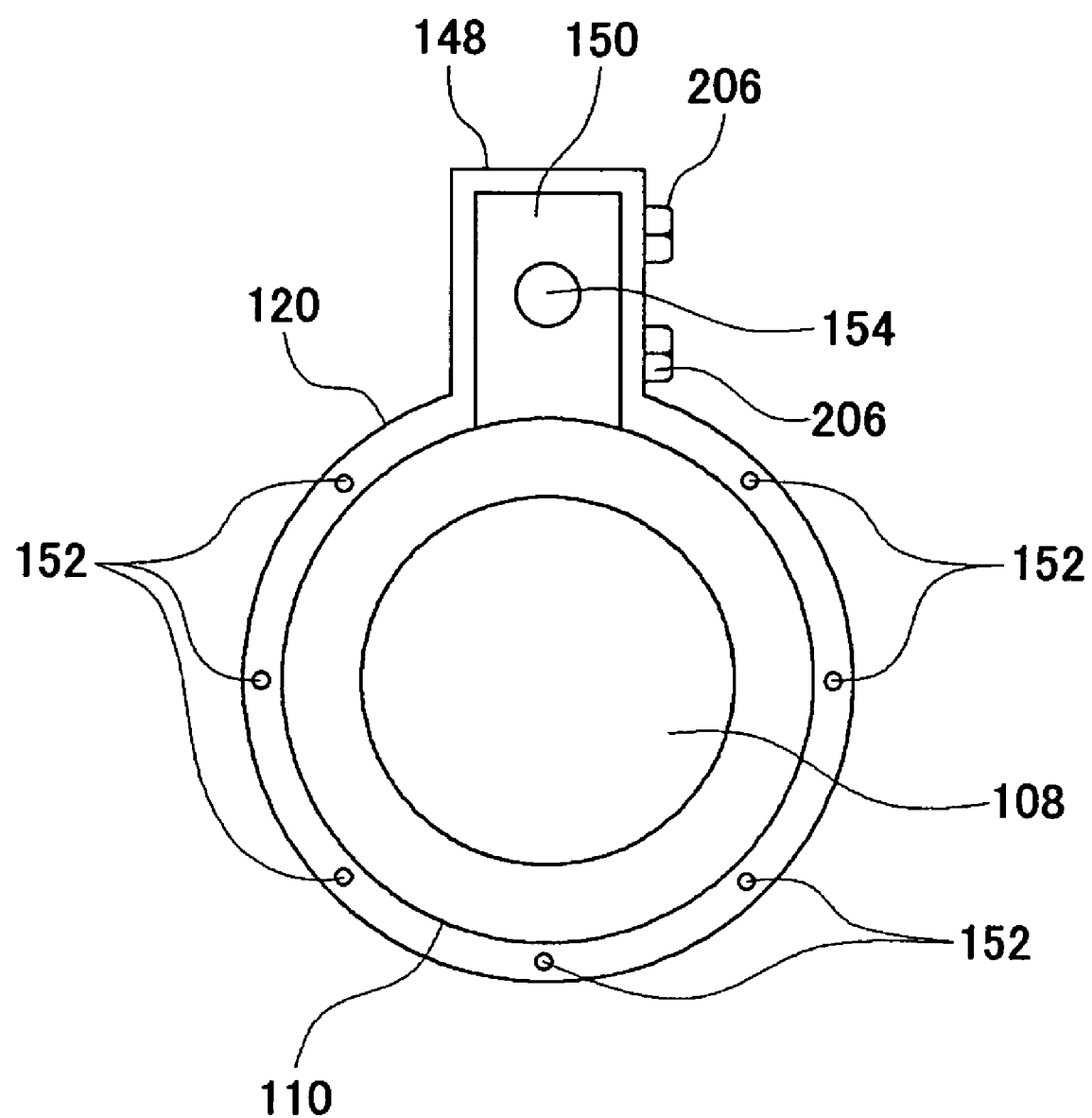

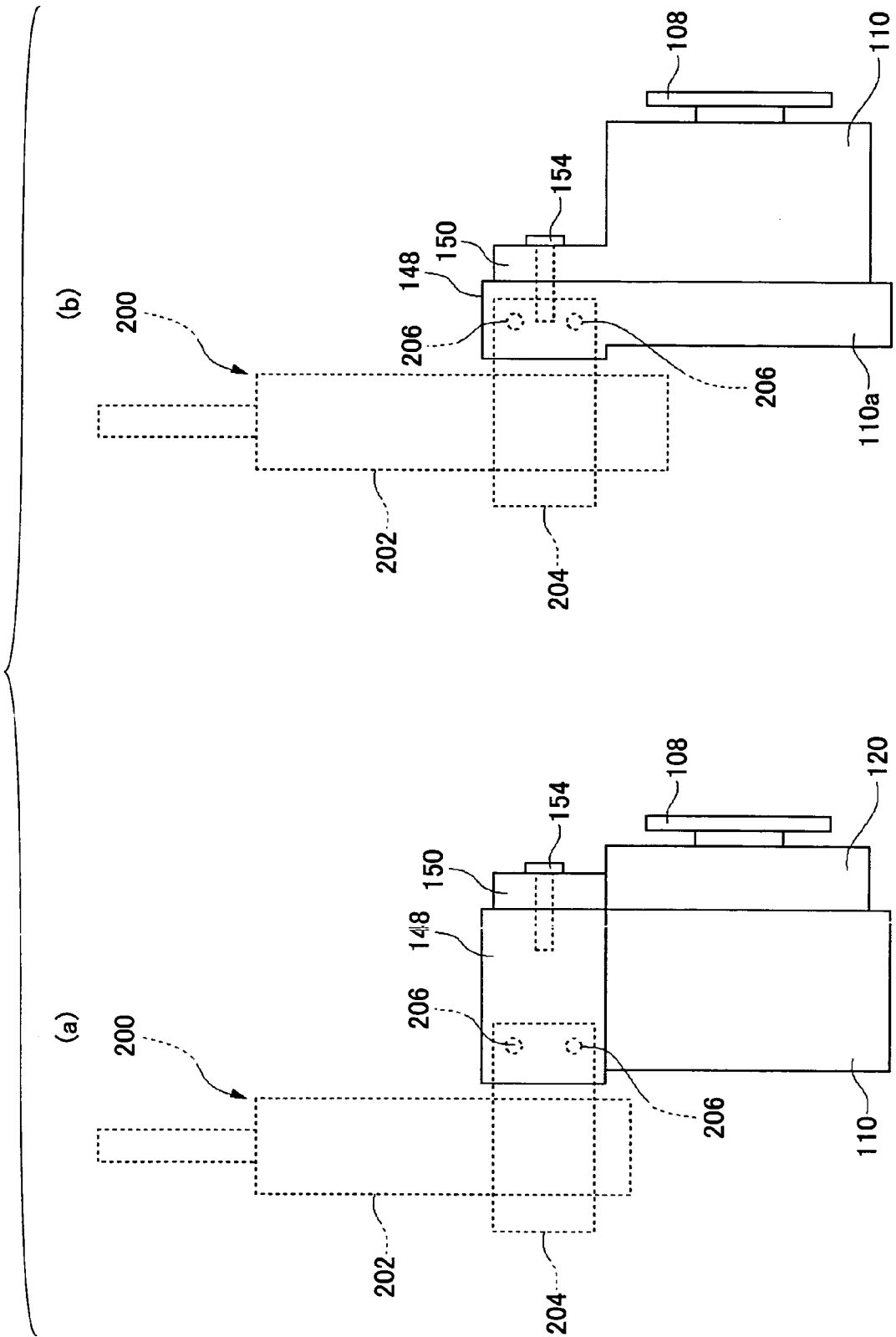

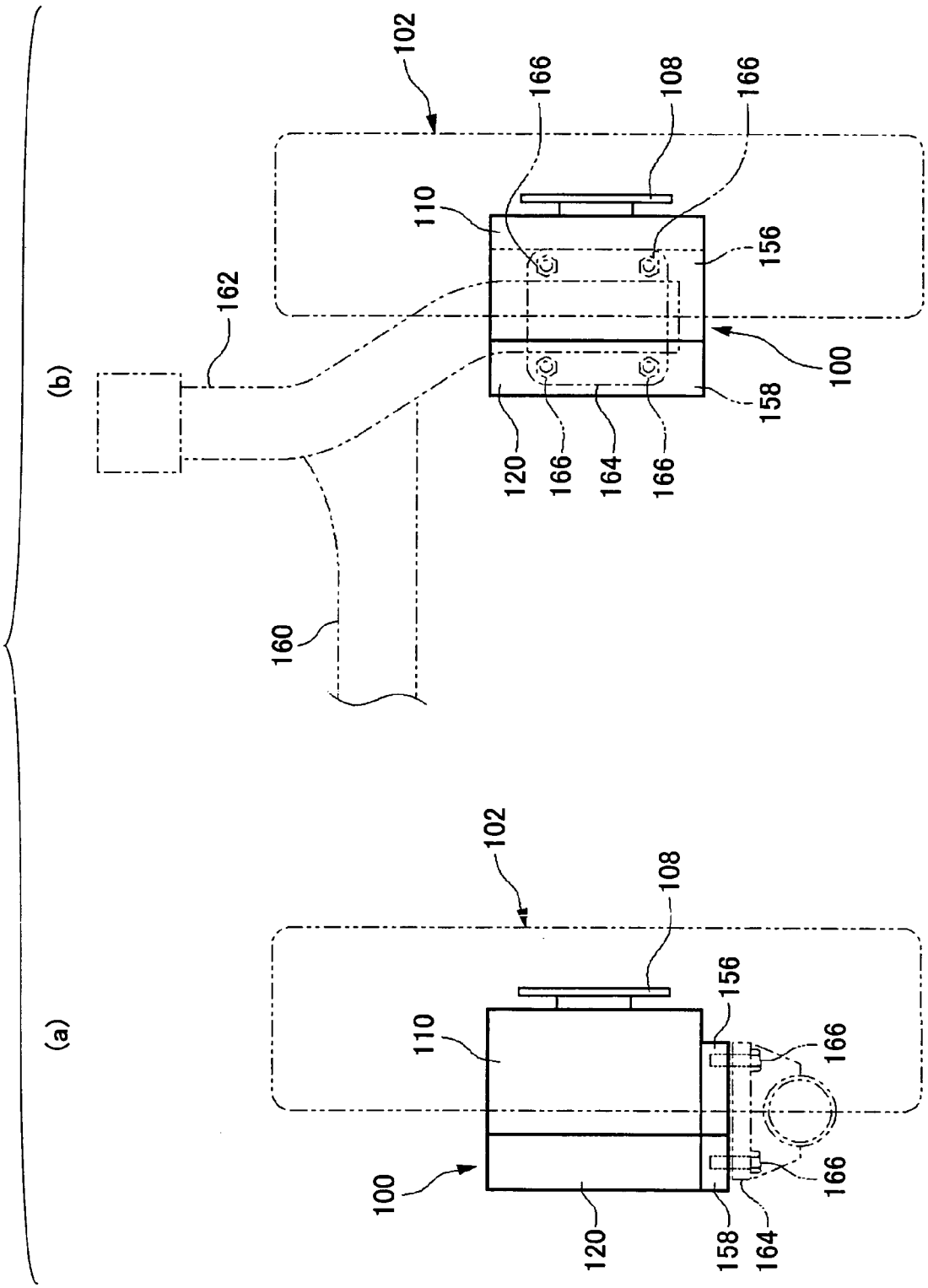

HOUSING STRUCTURE OF IN-WHEEL MOTOR

BACKGROUND OF THE INVENTION

1. Field of the Invention

The present invention generally relates to housing structures of in-wheel motors and more particularly, to a housing structure of an in-wheel motor whereby an in-wheel motor can be securely attached to a suspension system.

2. Description of the Related Art

Recently, electric motors have been used as a driving source of vehicles and will come to be used more. More specifically, an in-wheel motor where the electric motor is directly installed inside of a wheel as a driving wheel is made practicable. The in-wheel motor generally has a structure where the electric motor, a reduction mechanism, a control circuit, and the like are received in a unified housing. This housing is connected to a strut of a suspension system or the like.

From the perspective of productivity or assemble-ability, a housing receiving a component, such as the housing of the in-wheel motor, may be formed by plural divided housings. For example, the housing receiving the component may be formed by a box-shaped divided housing having an opening part and a cover type divided housing covering the opening part. The housing receiving the component may be formed by fitting opening parts of two box-shaped divided housings to each other. Structures of these housings are completed by installing the electric motor or a reduction gear into the box-shaped divided housing and then substantially sealing a space where the electric motor or a reduction gear is installed by another box-shaped or cover type divided housing.

In a case where the housing formed by combining such divided housings is connected and fixed to the suspension system or the like, a fixing boss is projected from one of the divided housings so as to be fastened to a bracket part of the suspension system. See Japanese Patent Application Publication No. 5-338446.

However, in the above-discussed structure, the weight of the vehicle supported by the wheel is concentrated on a connection part of the divided housings. It is preferable that the weight of a part below a spring of the suspension system be made light in order to sufficiently bring the capability of the suspension system into full play. Because of this, it is not preferable to extremely increase the thickness of the divided housing or the area of the connection part. Rather, various measurements are required such that a member is made thick enough to obtain sufficient strength or rigidity of the connection part.

SUMMARY OF THE INVENTION

Accordingly, it is a general object of the present invention to provide a novel and useful housing structure of an in-wheel motor in which one or more of the problems described above are eliminated.

Another and more specific object of the present invention is to provide a housing structure of an in-wheel motor whereby sufficient strength and rigidity of a connection part can be obtained in a simple structure.

The above-object of the present invention is achieved by a housing structure of an in-wheel motor, the housing structure being formed by combining a plurality of divided housings, the housing structure receiving at least an electric motor for revolving a wheel, the housing structure including:

a suspension side divided housing having a fixing boss for fixing the housing structure to a suspension system; and a connection side divided housing connecting to the suspension side divided housing and having a connection boss formed in a position corresponding to a position where the fixing boss is formed.

The in-wheel motor includes at least an electric motor. The in-wheel motor may also include, for example, a reduction gear and a control substrate. The in-wheel motor may include only the electric motor. For example, in a case where the in-wheel motor includes a reduction gear, a motor housing is used as the connection side divided housing and a gear housing is used as the suspension side divided housing. The housing of the in-wheel motor is be formed by combining these two housings. In a case where the in-wheel motor includes only the electric motor, the motor housing is used as the connection side divided housing and a cover housing covering an opening part of the motor housing is used as the suspension side divided housing. The housing of the in-wheel motor is be formed by combining these two housings. In a structure of the housing of the in-wheel motor, the motor housing is used as the suspension side divided housing and the gear housing is used as the connection side divided housing. In addition, the number of the divided housings is optional. The housing of the in-wheel motor can be formed by combining the necessary number of divided housings.

According to this structure, the fixing boss of the suspension side divided housing directly fixed to the suspension system and the connection boss of the connection side divided housing formed in the position corresponding to the position where the fixing boss is formed are connected so that the suspension side divided housing and the connection side divided housing are connected. It is possible to secure mutual connection strength and rigidity of the suspension side divided housing and the connection side divided housing by the connection boss. Since the connection boss is formed in the position corresponding to the position where the fixing boss is formed, it is possible to minimize the size and weight of the housing.

Furthermore, the connection side divided housing is indirectly fixed to the suspension system via the suspension side divided housing. Hence, high mechanical processing precision is not required among the suspension system, the connection side divided housing, and the suspension side divided housing. It is required to secure precision only between the suspension system and the connection side divided housing, and between the connection side divided housing and the suspension side divided housing. Hence, while the strength and rigidity of the housing of the in-wheel motor is secured, it is possible to secure productivity and easy assembly of the divided housings.

The above-object of the present invention is also achieved by a housing structure of an in-wheel motor, the housing structure being formed by combining a plurality of divided housings, the housing structure receiving at least an electric motor for revolving a wheel, the housing structure including:

a plurality of divided housings having fixing bosses for fixing the housing structure to a suspension system.

According to this structure, two or more divided housings having the fixing bosses are directly fixed to the suspension system, and it is possible to easily secure strength and rigidity of the connection part. In addition, the divided housings directly connected have respective fixing bosses. Hence, a wide fitting span of the suspension system to the housing can be secured and therefore it is possible to strongly and stably fix the housing to the suspension system.

Other objects, features, and advantages of the present invention will become more apparent from the following detailed description when read in conjunction with the accompanying drawings.

BRIEF DESCRIPTION OF THE DRAWINGS

FIG. 3 is a front view of the housing structure shown in FIG. 2;

FIG. 4 is a schematic view showing a second embodiment of the present invention where a housing structure of the in-wheel motor having a structure different from a structure of the in-wheel motor shown in FIG. 2 is connected to the MacPherson type (strut-type) suspension system; and FIG. 5 is a schematic view showing a third embodiment of the present invention where a housing structure of the in-wheel motor is connected to a beam-type suspension system.

DETAILED DESCRIPTION OF THE PREFERRED EMBODIMENTS

A description is given below, with reference to FIG. 1 through FIG. 5, of embodiments of the present invention.

First Embodiment

A housing structure of an in-wheel motor in this embodiment is formed by combining plural divided housings. At least an electric motor, as a driving source of an in-wheel motor, is received inside of the combined housings. If necessary, a reduction gear, a control substrate, or the like other than the electric motor may be received. In this case, a receiving space inside of the housings may be a single room. Plural rooms may be prepared depending on the combination of the divided housings that the electric motor, the reduction gear, the control substrate, or the like may be received in different rooms. Depending on an optional combination of the electric motor, the reduction gear, the control substrate, or the like, for example, the electric motor and the control substrate may be received in the same room.

Figure 1:
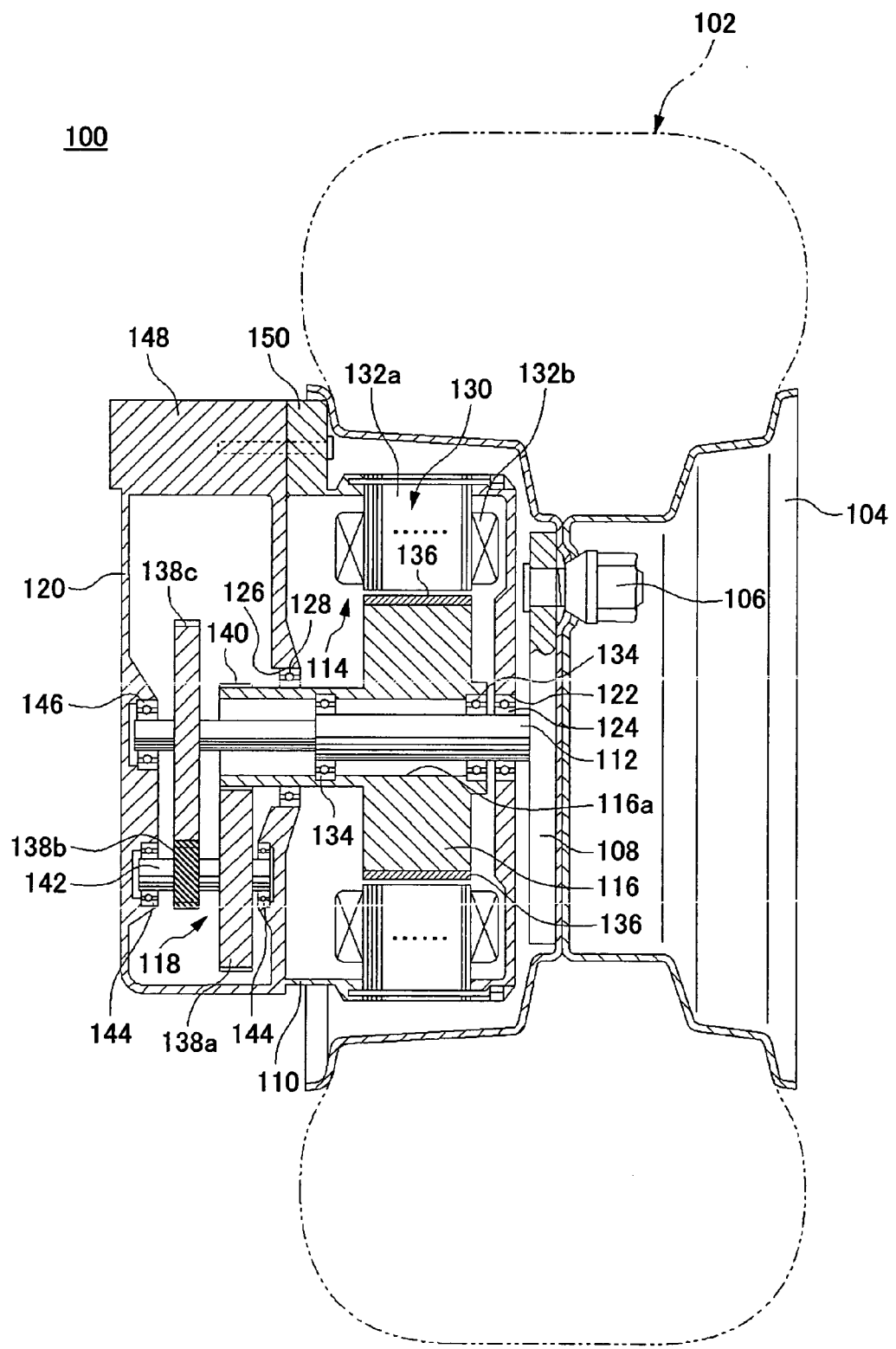
FIG. 1 is a cross-sectional view showing a housing structure of an in-wheel motor and the internal structure of the in-wheel motor of a first embodiment of the present invention.

FIG. 1 is a cross-sectional view showing an internal structure of the in-wheel motor 100 including the electric motor and the reduction gear of the first embodiment of the present invention. Although the control substrate can be received in the same space as the space for the electric motor, an illustration of the control substrate is omitted. A control device side of the vehicle side (not shown) may have a function of the control substrate.

In the in-wheel motor for the vehicle, as shown in FIG. 1, a wheel 104 where a tire 102 is installed is fixed to a hub wheel 108 by a hub nut 106. In this embodiment, the hub wheel 108 is fixed to an output shaft 112 projecting from a motor housing 110 formed as a connection side divided housing so as to rotate with the output shaft 112. An electric motor 114 is received inside of the motor housing 110. A gear housing 120 is connected and fixed to a side surface of the vehicle side of the motor housing 110. The gear housing 120 functions as a suspension side divided housing which receives a reduction gear 118 for receiving the rotation of a rotor 116 of the electric motor 114. Therefore, in the example shown in FIG. 1, the housing of the in-wheel motor 100 is formed by two divided housings, namely the motor housing 110 and the gear housing 120. A rotational output generated by the electric motor 114 is transferred to the output shaft 112 and the wheel 104 via the reduction gear 118 so that the wheel 104 is rotated with the tire 102 by this transferred rotational force.

The motor housing 110 has a bowl-shaped configuration wherein an opening part is formed at the left side in FIG. 1. An opening part 122 is formed at a side of the wheel 104 so that the output shaft 112 extending from a side of the gear housing 120 can be inserted in the opening part 122. A bearing 124 is provided at the opening part 122 and the output shaft 112 can be rotated in the motor housing 110.

In consideration of making the unsprung weight light and endurance of and ease in manufacturing the suspension (not shown), the motor housing 110 is made by aluminum die-casting, for example.

A ring-shaped stator 130 is fixed to an internal wall surface of the motor housing 110. The rotor 116 is provided inside of the stator 130. The output shaft 112 is rotatably received inside of the rotor 116.

In the stator 130, plural magnetic steel plates having plate-shaped configurations are laminated, for example. The stator 130 is formed by a ring-shaped iron core 132a and a three-phase magnetic field coil 132b. The iron core 132a is alternately formed by slot parts extending in a center direction, namely the center direction of the rotor 116, and teeth parts. The respective teeth parts of the iron core 132a are wound by the magnetic field coil 132b. The magnetic field coil 132b is arranged at a side of the internal circumference of the iron core 132a forming the stator 130. Hence, considering installation of the magnetic field coil 132b, it is preferable that the iron core 132a be assembled in a ring shape as a divided iron core which is divided in plural parts in a radius direction after the magnetic field coil 132b is installed. By supplying an electric current to the installed magnetic field coil 132b at designated timing in turn, a rotational magnetic field is generated in the stator 130 so that the rotor 116 can be rotated.

The rotor 116 arranged at the side of the internal circumference of the stator 130 has an insertion hole 116a so that the output shaft 112 can be rotatably inserted in the insertion hole 116a situated in the center of the rotor 116. The insertion hole 116a is formed along the entire shaft length of the output shaft 112. The output shaft 112 can be independently rotated against the rotor 116 by plural bearings 134 arranged at the insertion hole 116a. The rotor 116 is formed by a large diameter part facing the stator 130 and a small diameter part extending to the side of the reduction gear 118. Plural permanent magnets 136 are arranged at even intervals at an external circumferential surface of the large diameter part of the rotor 116. An attraction force and a repulsion force are repeatedly applied via the permanent magnet 136 based on the rotational magnetic field generated by the stator 130, so that the rotor 116 is rotated in a designated direction at a designated speed.

An opening part 126 is formed on a fixing surface of the motor housing 110 of the gear housing 120 so that the rotor 116 can be inserted in the opening part 126. A bearing 128 is arranged at the opening part 126 and the rotor 116 is rotatably supported against the gear housing 120. A small diameter part of the rotor 116 extends inside of the gear housing 120. A rotor gear 140 meshing with a first gear 138a of the reduction gear 118 is formed at the head end part of the small diameter part of the rotor 116. It is preferable that the gear housing 120, as well as the motor housing 110, be made by aluminum die-casting, for example. In the gear housing 120, a gear shaft 142 supporting the first gear 138a is rotatably supported by plural bearings 144. A second gear 138b having a small diameter is fixed to the gear shaft 142. Furthermore, the second gear 138b is meshed with a third gear 138c, having a large diameter fixed to the output shaft 112. Therefore, the rotational force of the rotor 116 is transferred to the output shaft 112 while the rotational speed is reduced to a designated speed by the reduction gear 118 and the torque of the rotational force is increased, so that the wheel 104 and the tire 102 are rotated. The output shaft 112 is rotatably supported by a bearing 146 arranged inside of the gear housing 120 so that smooth rotational driving can be done. In a case of the structure shown in FIG. 1, a fixing boss 148 is uniformly formed at an upper part of the gear housing 120 so as to connect to, for example, a strut bracket of the suspension system (not shown). Therefore, the in-wheel motor 100 is fixed to the suspension system via the fixing boss 148.

In such an in-wheel motor 100, a designated amount of alternating current is supplied to the magnetic field coil 132b of the stator 130 by a torque order output from the motor control part based on the opening of an accelerator pedal or the operation of the brake pedal by the driver of the vehicle. As a result of this, the stator 130 generates the rotational magnetic field so as to rotate the rotor 116. That is, the tire 102 is driven with the wheel 104 at a designate rotational speed in a designated direction.

Figure 2:
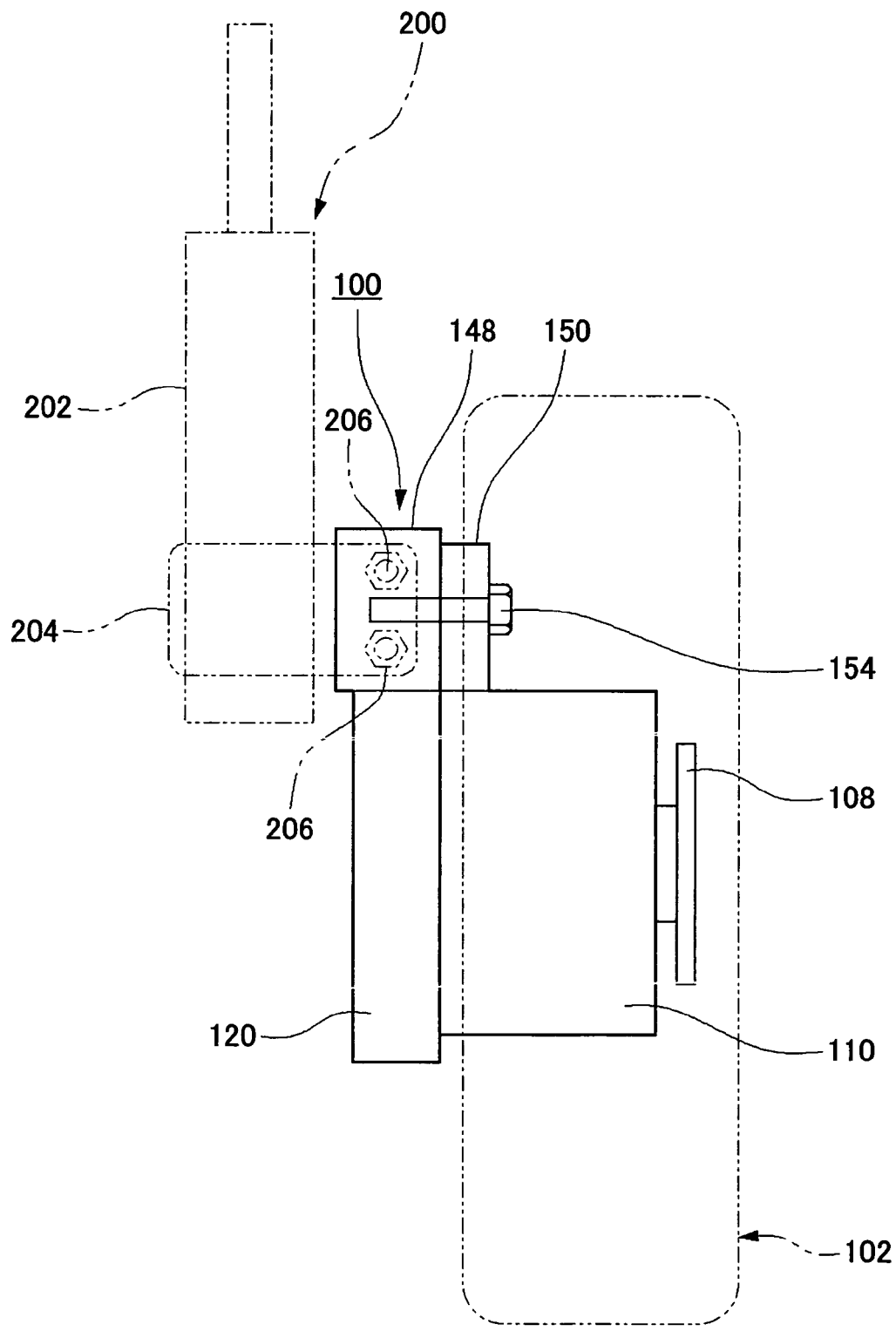
FIG. 2 is a schematic view showing the first embodiment of the present invention where the housing structure of the in-wheel motor is connected to a MacPherson type (strut-type) suspension system.

FIG. 2 is a schematic view showing a structure for connecting the in-wheel motor 100 to the strut 200 forming a part of the suspension system. FIG. 3 is a front view of the motor housing 110 and the gear housing 120. As shown in FIG. 2, the fixing boss 148 is formed at an upper part of the gear housing 120. The fixing boss 140 is tightly fixed to a strut bracket 204 fixed to the strut shell 202 of the strut 200 by bolts 206.

On the other hand, in the motor housing 110, a connection boss 150 is formed uniformly with the motor housing 110 in a position corresponding to the fixing boss 148 of the gear housing 120. The motor housing 110 is connected to the gear housing 120 by plural bolts 152. In addition to this, the motor housing 110 is strongly and stably fixed to the gear housing 120 by connecting the connection boss 150 and fixing boss 148 via a bolt 154 so that it is possible to secure sufficient connection strength and rigidity. Particularly, it is possible to provide a wider space in the motor housing 110 for the connection part of the connection boss 150 and the fixing boss 148, than for arranging position of the bolt 152. Therefore, it is possible to provide a large contact area and use the bolt 154 having a sufficiently large fastening force. Although a single bolt 154 is used in the case shown in FIG. 3, plural bolts may be used if necessary.

If the connection boss 150 does not exist, the motor housing 110 comes in contact with the gear housing 120 only at a cylindrical thick part and therefore it may be difficult to obtain sufficient connection strength and rigidity. For sufficient strength to be obtained in this state, the contact part may be required to be thick. This may cause a large size or a heavy weight of the entire housing so that the ability of the suspension system may be degraded.

According to this embodiment, since the connection boss 150 is formed in a position corresponding to the fixing boss necessary for fixing the housing to the suspension system, it is possible to minimize size and weight of the housing. The size of the fixing boss 148 for attaching the connection boss 150 is a size sufficient to secure the strength and rigidity necessary for connecting the motor housing 110 and the gear housing 120. Hence, it is possible to easily design the connection boss 150.

Only the fixing boss 148 is directly connected to the suspension system. The connection boss 150 of the motor housing 110 is not fastened to the suspension system. That is, the motor housing 110 is indirectly connected to the suspension system via the connection boss 150 and the fixing boss 148. Therefore, high mechanical processing precision for combining the suspension system, the gear housing 120, and the motor housing 110 is not required. That is, only the precision between the suspension system and the gear housing 120, and the precision between the gear housing 120 and the motor housing 110 are required. Hence, not only is it possible to easily manufacture respective parts but also it is possible to make a design easily matching conditions required for the housing of the in-wheel motor because only precision between the two parts is required. In addition, it is possible to easily do the assembly work.

Second Embodiment

FIG. 4-(a) and FIG. 4-(b) show a second embodiment of the present invention, more specifically another example of a housing structure of the present invention. An example, where arrangement of the electric motor and the reduction gear is opposite to the examples shown in FIG. 1 and FIG. 2, is shown in FIG. 4-(a). That is, the motor housing 110 is arranged as the suspension side divided housing and the gear housing 120 is arranged as the connection side divided housing in this embodiment. The connection boss 150 is formed in a position corresponding to the fixing boss 148 formed in the motor housing 110 and the same effect as the effect in the case shown in FIG. 2 can be obtained.

An example of an in-wheel motor not including the reduction gear is shown in FIG. 4-(b). In this case, the cover member 110a of the motor housing 110 receiving the electric motor is arranged as the suspension side divided housing. The motor housing 110 is arranged as the connection side divided housing. The connection boss 150 is formed in a position corresponding to the fixing boss 148 formed in the cover member 110a and the same effect as the effect in the case shown in FIG. 2 can be obtained. Therefore, high mechanical processing precision for combining the suspension system, the gear housing 120, and the motor housing 110 are not required. Hence, it is possible to easily manufacture and assemble respective parts.

Third Embodiment

The strut type suspension system as an example of the suspension system is shown in FIG. 2 and FIG. 4. FIG. 5 shows a third embodiment of the present invention, more specifically an example where the housing of the in-wheel motor 100 is fitted in a beam type suspension system.

FIG. 5-(a) is a rear view of the in-wheel motor 100 seen from a rear side of the vehicle. As well as the structural example shown in FIG. 1, the in-wheel motor shown in FIG. 5 is formed by combining the motor housing 110 receiving the electric motor as the divided housing and the gear housing 120 receiving the reduction gear. If necessary, two or more divided housing can be combined. As shown in FIG. 5-(a) and FIG. 5-(b), in this embodiment, two or more divided housings have the corresponding unified fixing bosses 156 and 158 for fixing the suspension system. The fixing bosses 156 and 158 are fastened by a bolt 166 via an arm part 162 extending from a beam part 160 of the beam suspension system and an arm part bracket 164. That is, the in-wheel motor 100 is formed by the divided housings, both of which are directly connected to the suspension system. The respective divided housings having the fixing bosses are directly connected to the suspension system so that a fitting span sufficient to obtain the necessary strength and rigidity for the connection between the suspension system and the in-wheel motor 100 can be easily secured.

In the example shown in FIG. 5-(*a*) and FIG. 5-(*b*), the arrangement of the electric motor and the reduction gear forming the in-wheel motor 100 may be opposite and the arrangement of the motor housing and the gear housing as the divided housings may be opposite. The in-wheel motor may be formed by only the electric motor and the divided housings may be formed by the cover member and the motor housing. In this case, the same effect as the effect in the example shown in FIG. 5-(*a*) and FIG. 5-(*b*) can be obtained.

The present invention is not limited to these embodiments, but variations and modifications may be made without departing from the scope of the present invention.

For example, the configuration of the divided housing is not limited to the above-discussed embodiments. As long as the suspension side divided housing has the fixing boss and the connection side housing has the connection boss situated in the position corresponding to the fixing boss, configurations of other parts may be optionally selected and the same effect as the effect discussed above can be obtained. Similarly, as long as two or more divided housings respectively have the fixing bosses, configurations of other parts may be optionally selected and the same effect as the effect discussed in the example shown in FIG. 5-(*a*) and FIG. 5-(*b*) can be obtained.

The structure of the in-wheel motor shown in FIG. 1 is just an example of the present invention. As long as the in-wheel motor includes the electric motor received in the housing, the structure of the electric motor and the structure of the fitted reduction gear are optional and the same effect as the effect discussed above can be obtained.

This patent application is based on Japanese Priority Patent Application No. 2004-245886 filed on Aug. 25, 2004, the entire contents of which are hereby incorporated by reference.

What is claimed is:

1. A housing structure of an in-wheel motor, the housing structure being formed by combining a plurality of divided housings, the housing structure receiving at least an electric motor for revolving a wheel, the housing structure comprising:
   a suspension side divided housing having a fixing boss for fixing the housing structure to a suspension system; and
   a connection side divided housing connecting to the suspension side divided housing and having a connection boss formed in a position corresponding to a position where the fixing boss is formed;
   wherein the connection boss includes at least one connection piece for connecting the connection side divided housing with the suspension side divided housing;
   wherein the fixing boss includes at least one connection piece for fixing the housing structure to the suspension system;
   wherein the at least one connection boss connection piece is on a plane that begins at one end of the at least one connection boss connection piece and ends at the other end of the at least one connection boss connection piece;
   wherein the plane is perpendicular to the at least one fixing boss connection piece; and
   wherein the at least one fixing boss connection piece intersects the plane of the at least one connection boss connection piece.

2. The housing structure of the in-wheel motor as claimed in claim 1,
   wherein the connection side divided housing is indirectly connected to the suspension system via the suspension side divided housing.

3. The housing structure of the in-wheel motor as claimed in claim 1,
   wherein the connection side divided housing is indirectly connected to the suspension system via the connection boss and the fixing boss.

4. The housing structure of the in-wheel motor as claimed in claim 1, wherein the suspension side divided housing is a cover member of the connection side divided housing, and the fixing boss is formed in the cover member.

5. The housing structure of the in-wheel motor as claimed in claim 1, wherein the connection boss and the fixing boss are connected by a bolt.

* * * * *